US011613287B2

(12) United States Patent
Chiao et al.

(10) Patent No.: US 11,613,287 B2
(45) Date of Patent: *Mar. 28, 2023

(54) CART WITH REMOVABLE TABLE EXTENSIONS

(71) Applicant: Trinity International Industries, L.L.C., Carson, CA (US)

(72) Inventors: Jerry Chiao, Newark, CA (US); Yuan-Luen Chuang, Shanghai (CN); Cze-Chao Tam, Palos Verdes, CA (US); Wai Kit Chan, Dongguan (CN)

(73) Assignee: TRINITY INTERNATIONAL INDUSTRIES, L.L.C., Carson, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 17/114,914

(22) Filed: Dec. 8, 2020

(65) Prior Publication Data

US 2021/0086814 A1 Mar. 25, 2021

Related U.S. Application Data

(63) Continuation of application No. 16/522,020, filed on Jul. 25, 2019, now Pat. No. 10,913,474.

(51) Int. Cl.
*B62B 3/00* (2006.01)
*B62B 3/02* (2006.01)
*A47B 5/02* (2006.01)

(52) U.S. Cl.
CPC . *B62B 3/02* (2013.01); *A47B 5/02* (2013.01)

(58) Field of Classification Search
CPC .... B62B 3/02; A47B 5/02; A47B 1/04; A47B 31/04
See application file for complete search history.

(56) References Cited

U.S. PATENT DOCUMENTS 2,594,262 A * 4/1952 Howe .................... A47B 31/04
108/81
3,158,112 A * 11/1964 Smith .................... D06F 81/02
108/115

(Continued)

FOREIGN PATENT DOCUMENTS

CN 206102517 U 4/2017
DE 19826463 A1 12/1999

OTHER PUBLICATIONS

International Preliminary Report on Patentability (Chapter II) & Written Opinion dated Feb. 12, 2021 from PCT Application No. PCT/US2020/070083.

(Continued)

*Primary Examiner* — Hau V Phan
(74) *Attorney, Agent, or Firm* — Innovation Capital Law Group, LLP; Vic Lin

(57) ABSTRACT

A cart, such as a kitchen cart, has a bottom shelf supported by leg members. The leg members further support a central shelf or basket at a user-desired position along the legs, and a top support. The top support can retain a top work surface thereto. On at least one side of the cart, arms can pivot outward, adjacent the top work surface, to support one or more work surface extension members. Typically, there may be one work surface extension member on each side of the cart, providing the user with additional workspace and providing the option of removal without interfering with the functionality of the cart.

15 Claims, 8 Drawing Sheets

(56) References Cited

U.S. PATENT DOCUMENTS

| | | | | |
|---|---|---|---|---|
| 3,874,531 A | * | 4/1975 | Mayo | B60D 1/00 |
| | | | | 280/47.35 |
| D363,590 S | | 10/1995 | Kazmerchek et al. | |
| D800,483 S | * | 10/2017 | Innes | D34/21 |
| D817,583 S | * | 5/2018 | Reyes | D34/19 |
| 10,913,474 B1 | * | 2/2021 | Chiao | A47B 1/04 |
| 2005/0034783 A1 | * | 2/2005 | Laird | B25H 1/14 |
| | | | | 144/287 |
| 2013/0026120 A1 | * | 1/2013 | Johnson | B65H 67/085 |
| | | | | 211/85.5 |

OTHER PUBLICATIONS

Examiner Report dated Oct. 13, 2021 from Canadian application No. 3,131,911, 7 pages.

\* cited by examiner

CART WITH REMOVABLE TABLE EXTENSIONS

CROSS-REFERENCE TO RELATED APPLICATIONS

This application is a continuation of U.S. Non-Provisional patent application Ser. No. 16/522,020, filed Jul. 25, 2019, the disclosure of which is incorporated by reference herein.

BACKGROUND OF THE INVENTION

1. Field of the Invention

Embodiments of the invention relate generally to storage solutions. More particularly, embodiments of the invention relate to a cart, such as a kitchen cart, having a table top with one or more removable table extensions.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Carts are often used for various storage purposes. Typical carts, if they include any top surface, are fixed in size and configuration. Thus, these carts cannot allow for a variable top surface size. If additional space is needed, the user must purchase another cart or arrive at a custom designed solution. Further, such carts are often fixed in height of the shelves, where if relatively tall items are desired to be stored, a specific conventional cart would be needed to allow for the storage of these tall items.

In view of the foregoing, there is a need for a cart that can include a variably sized top surface, that can permit shelving adjustability and that provide additional features, as described herein.

SUMMARY OF THE INVENTION

Embodiments of the present invention provide a cart comprising a plurality of legs; a top member supported by the plurality of legs; at least one set of pivot arms disposed on adjacent ones of the plurality of legs; and a side member supportable, adjacent the top member, by the at least one set of pivot arms, wherein the at least one set of pivot arms is movable between a side member support position, extending outward from an outer periphery of the top member, and a storage position, disposed within the outer periphery of the top member.

Embodiments of the present invention further provide a cart comprising a plurality of legs; a top support supported at a top end of each of the plurality of legs; a top member supported on the top support; a pivot arm pivotably attached to each of the plurality of legs; a side member supportable, adjacent the top member, by two of the pivot arms disposed on adjacent ones of the plurality of legs; a bottom storage element attached adjacent a bottom end of each of the plurality of legs; and a middle storage element attached along a length of each of the plurality of legs, wherein each of the pivot arms is movable between a side member support position, extending outward from an outer periphery of the top member, and a storage position, disposed within the outer periphery of the top member.

Embodiments of the present invention also provide a cart comprising a plurality of legs; a top member supported on the top support; a pivot arm pivotably attached to each of the plurality of legs; and a side member supportable, adjacent the top member, by two of the pivot arms disposed on adjacent ones of the plurality of legs, wherein each of the pivot arms is movable between a side member support position, extending outward from an outer periphery of the top member, and a storage position, disposed within the outer periphery of the top member; the side member includes slots formed on a bottom side thereof, the slots configured to receive a top portion of each of the two pivot arms therein to limit or prevent movement of the side member when positioned adjacent the top member and supported by the two pivot arms positioned in the side member support position; and the side member includes a pivoting lock movable between a first position, covering a portion of the slot, and a second position that does not cover the slot the pivoting lock movable from the second position to the first position after the side member is positioned with the portion of the two pivot arms positioned in the slots, thereby preventing removal of the side member from the two pivot arms.

In some embodiments, the plurality of legs includes four legs positioned adjacent corners of the top member.

In some embodiments, the cart further includes a storage accessory spanning between adjacent ones of the plurality of legs. In some embodiments of the invention, the storage accessory is a hook arm.

In some embodiments, the side member includes two side members positioned at opposite ends of the top member and the at least one set of pivot arms include two sets of two pivot arms.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
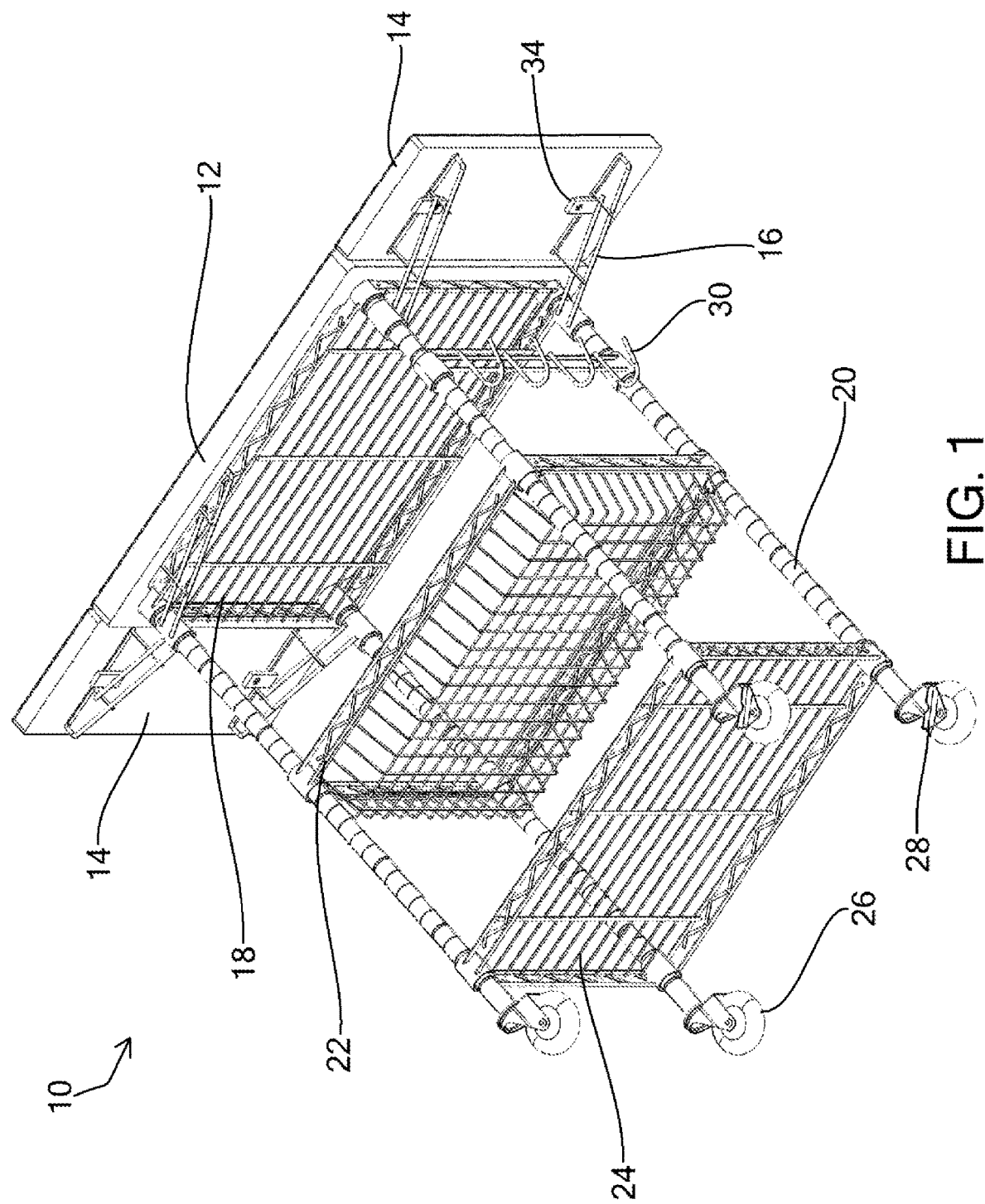
FIG. 1 illustrates a perspective bottom view of a cart according to an exemplary embodiment of the present invention.
Figure 2:
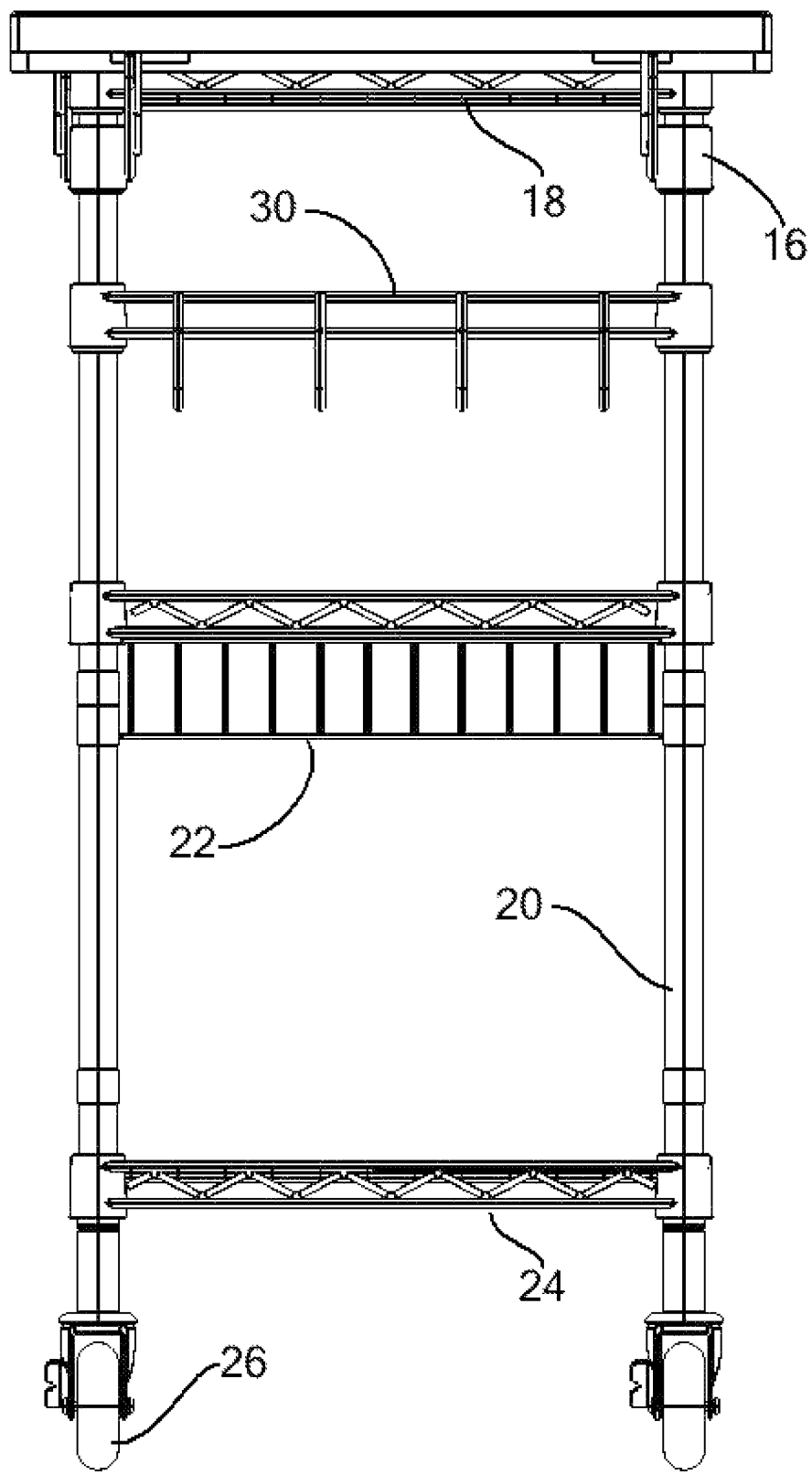
FIG. 2 illustrates a side view of the cart of FIG. 1.

Unless otherwise indicated illustrations in the figures are not necessarily drawn to scale.

The invention and its various embodiments can now be better understood by turning to the following detailed description wherein illustrated embodiments are described.

It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a cart, such as a kitchen cart, having a bottom shelf supported by leg members. The leg members further support a central shelf or basket, positionable at a user-adjustable height along the legs, and a top support. The top support can retain a top work surface thereto. On at least one side of the cart, arms can pivot outward, adjacent the top work surface, to support one or more work surface extension members. Typically, there may be one work surface extension member on each side of the cart, providing the user with additional workspace and providing the option of removal without interfering with the functionality of the cart.

Figure 5:
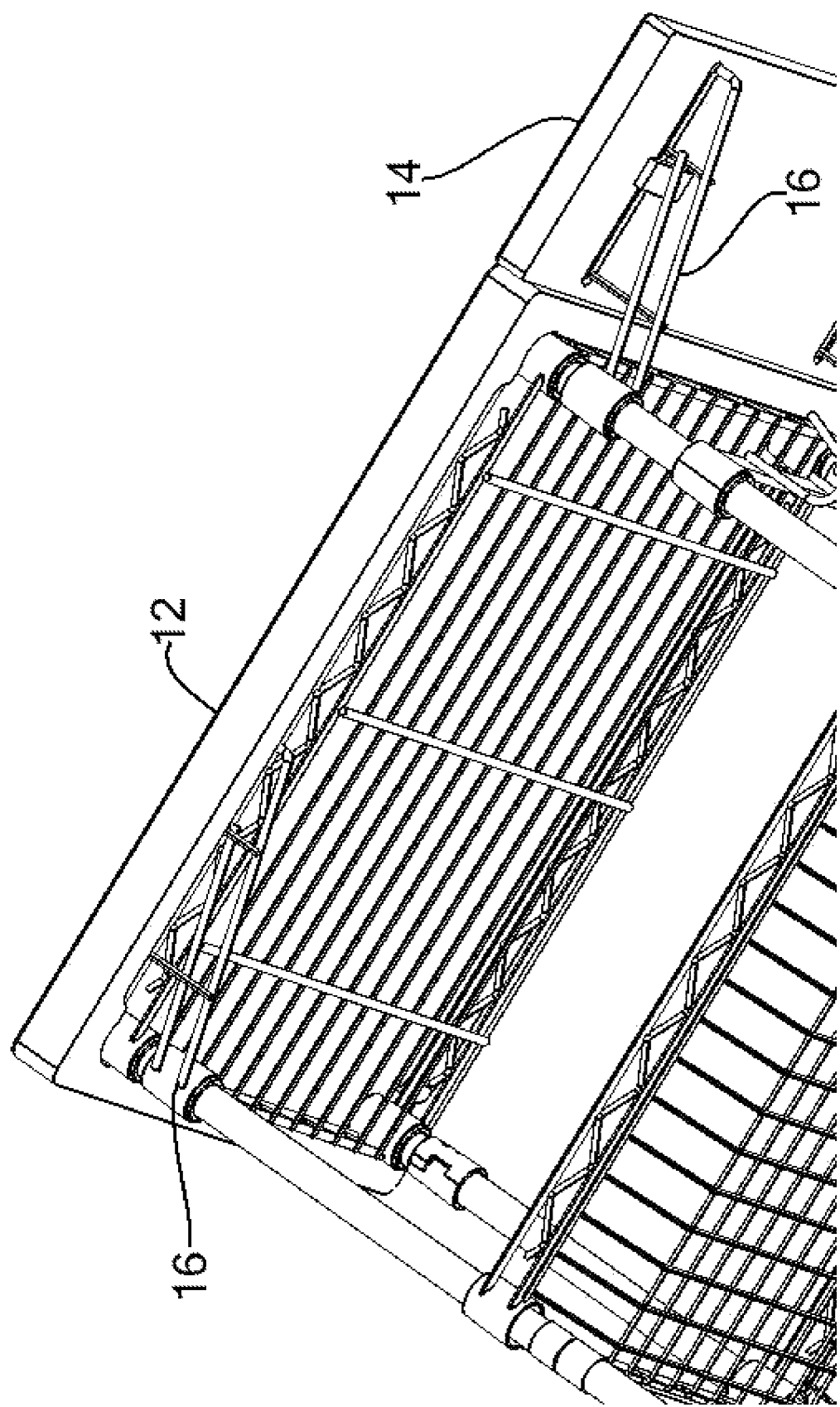
FIG. 5 illustrates a detailed perspective view showing a pivoting arm on one side of the cart of FIG. 1 in a storage position and a pivoting arm on the other side of the cart engaging a shelf.

Referring now to FIGS. 1 through 4, a cart 10, also referred to as kitchen cart 10, can include a top member 12, also referred to top work surface 12, and removable side members 14. A plurality of pivoting arms 16 can be movable between a stored position and a shelf-supporting position, as illustrated in FIG. 5, for example. In the shelf-supporting position, as shown in FIGS. 1 through 4, the side member 14 can be supported by the pivoting arms 16. While the Figures show the side members 14 being disposed on both sides of the cart 10, it should be understood that only one side member 14, with its related pivoting arms 16 may be incorporated into the cart 10. Further, while the Figures show the side members 14 on longitudinal ends (hereinafter, referred to as sides) of the top member 12, in some embodiments, the side members 14 may be positionable on one or both of the front and back ends of the top member 12.

Figure 3:
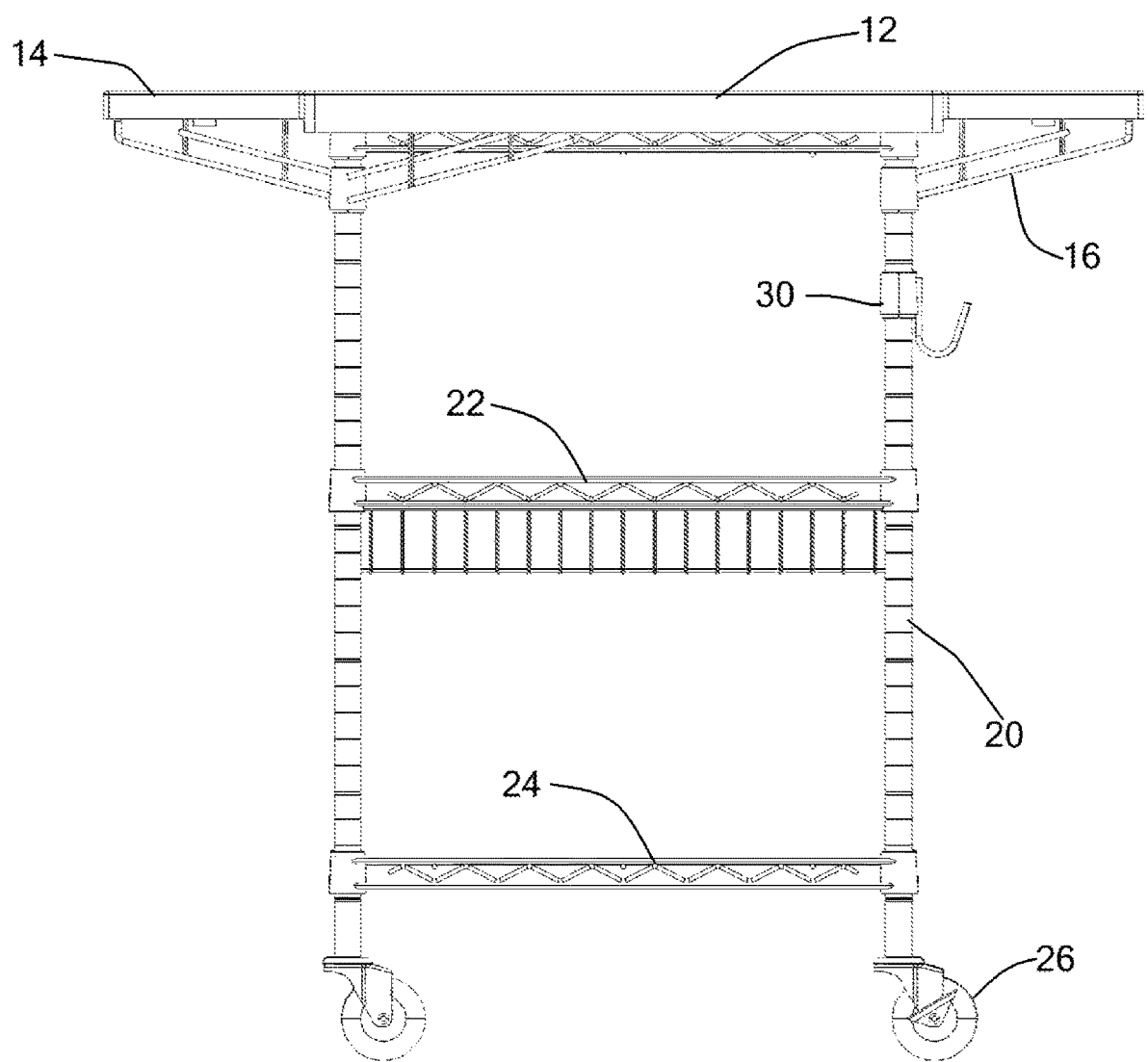
FIG. 3 illustrates a front view of the cart of FIG. 1.
Figure 4:
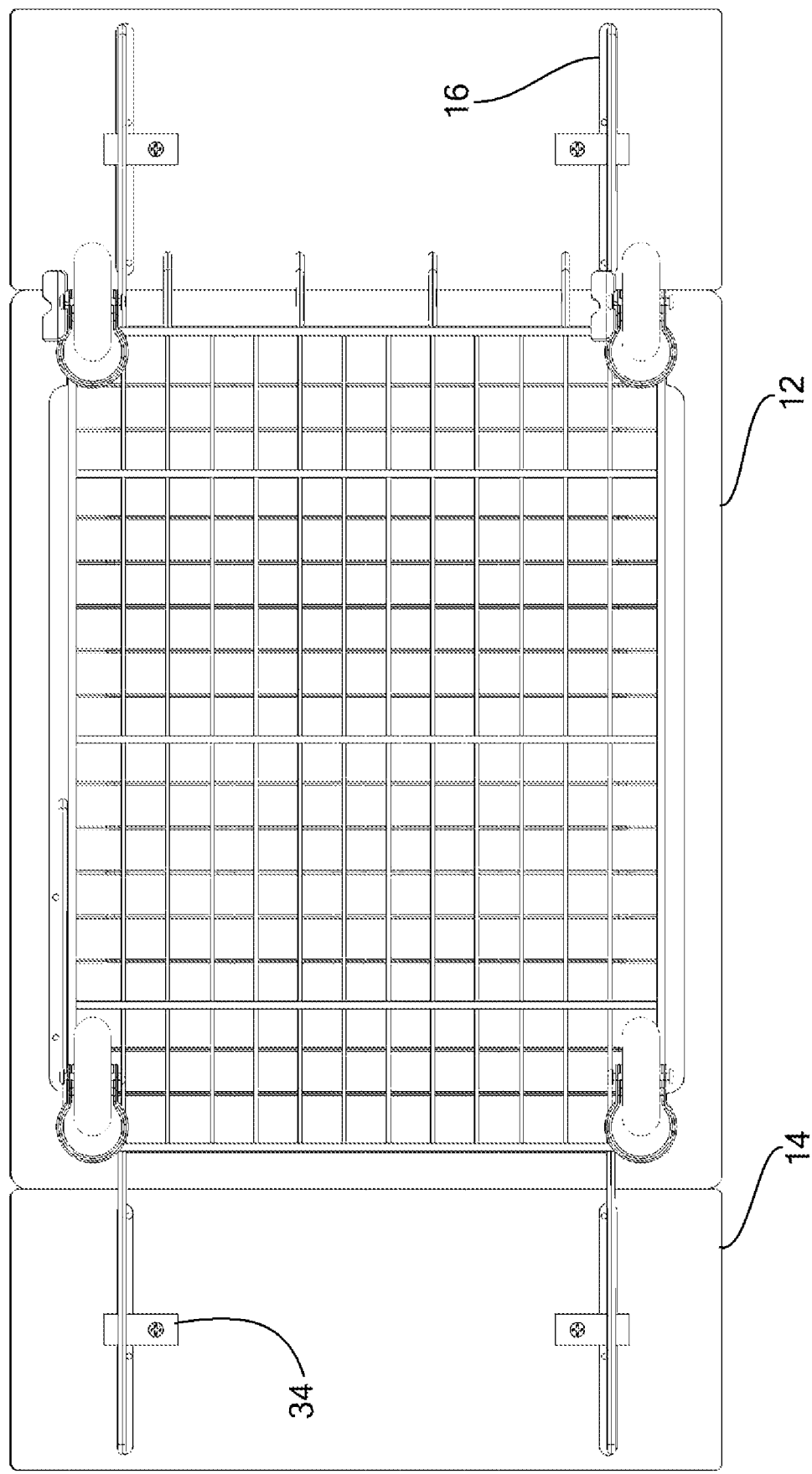
FIG. 4 illustrates a bottom view of the cart of FIG. 1.

FIG. 3 shows the left side pivoting arm 16 in both the side table support position and in the storage position for illustration purposes only. As described above, the pivoting arm is movable between these two positions.

A plurality of legs 20, typically four legs 20, may be used to support the pivoting arms 16, as discussed in greater detail below. The legs 20 may further support a top support rack 18 on which the top member 12 can rest. A middle shelf or basket 22 may also be supported by the legs 20. Finally, a bottom shelf or basket 24 may be supported by the legs 20. The legs 20 may be each formed integrally as single units or may be formed from multiple pieces joined together. While the Figures show the middle basket 22 and the bottom shelf 24, these elements may vary among baskets, shelves, or other storage solutions. As discussed in greater detail below, the bottom shelf 24, while typically positioned at the bottom of the legs 20, and the middle basket 22 may each be height adjustable along a length of the legs 20.

Wheels 26 may be positioned at the end of the legs 20 to permit easy movement of the cart 10. The wheels 26 may pivot for greater maneuverability. In some embodiments, on one or more of the wheels 26 can include a wheel lock 28 that can be user-engaged to prevent rotation of the wheel 26.

The cart 10 can include one or more accessory elements, such as a hook arm 30. The hook arm 30 may span between adjacent ones of the legs 20 and attach thereto. The hook arm 30 can include a plurality of hooks extending therefrom. Other accessories may be positioned between the adjacent legs 20, such as spoon rests, gripper elements, napkin or towel holders, or the like. As discussed below, the accessory elements may be height adjustable along the length of the legs 20.

Figure 6:
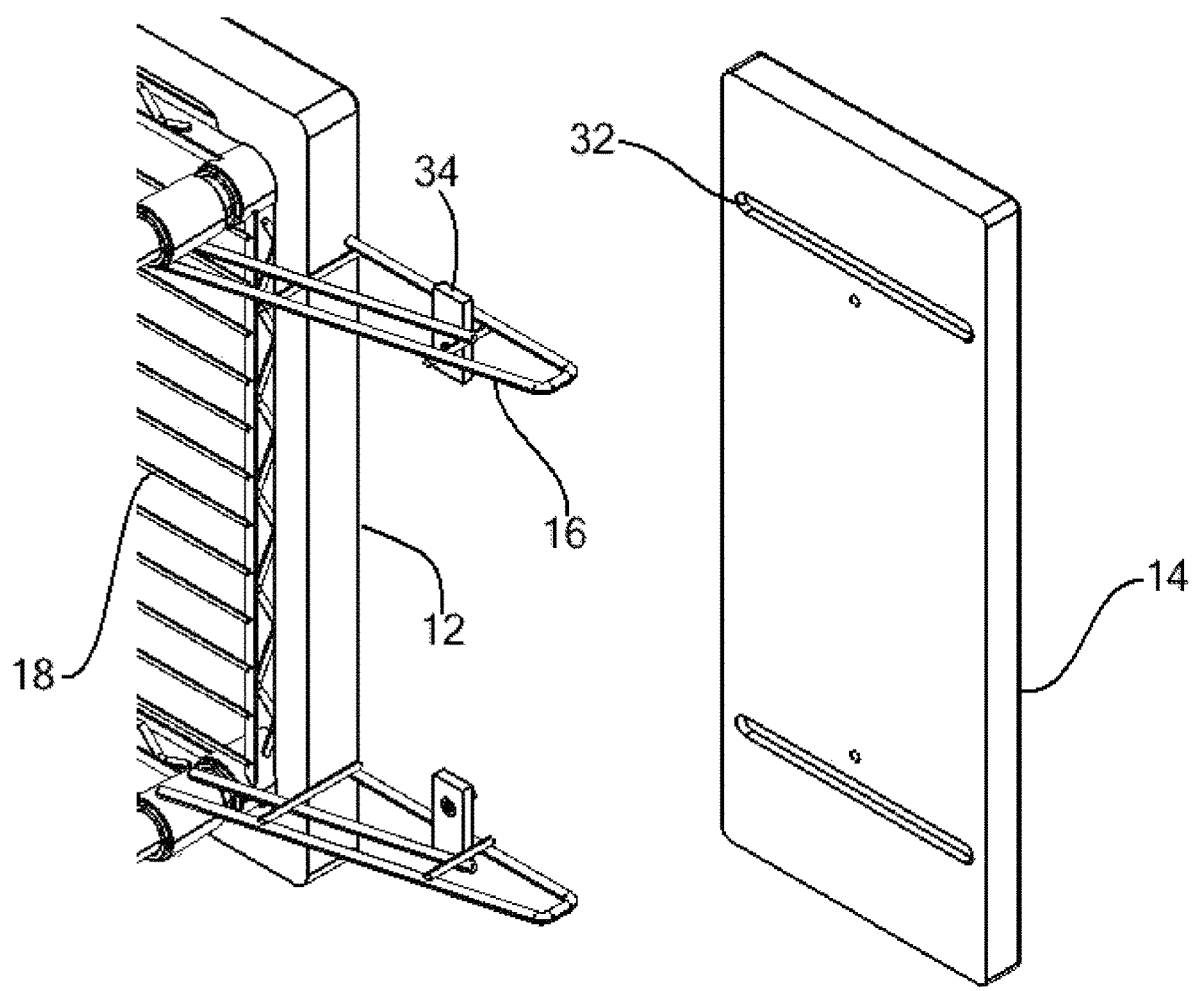
FIG. 6 illustrates a detailed bottom perspective view showing the shelf removed from the cart of FIG. 1.
Figure 7:
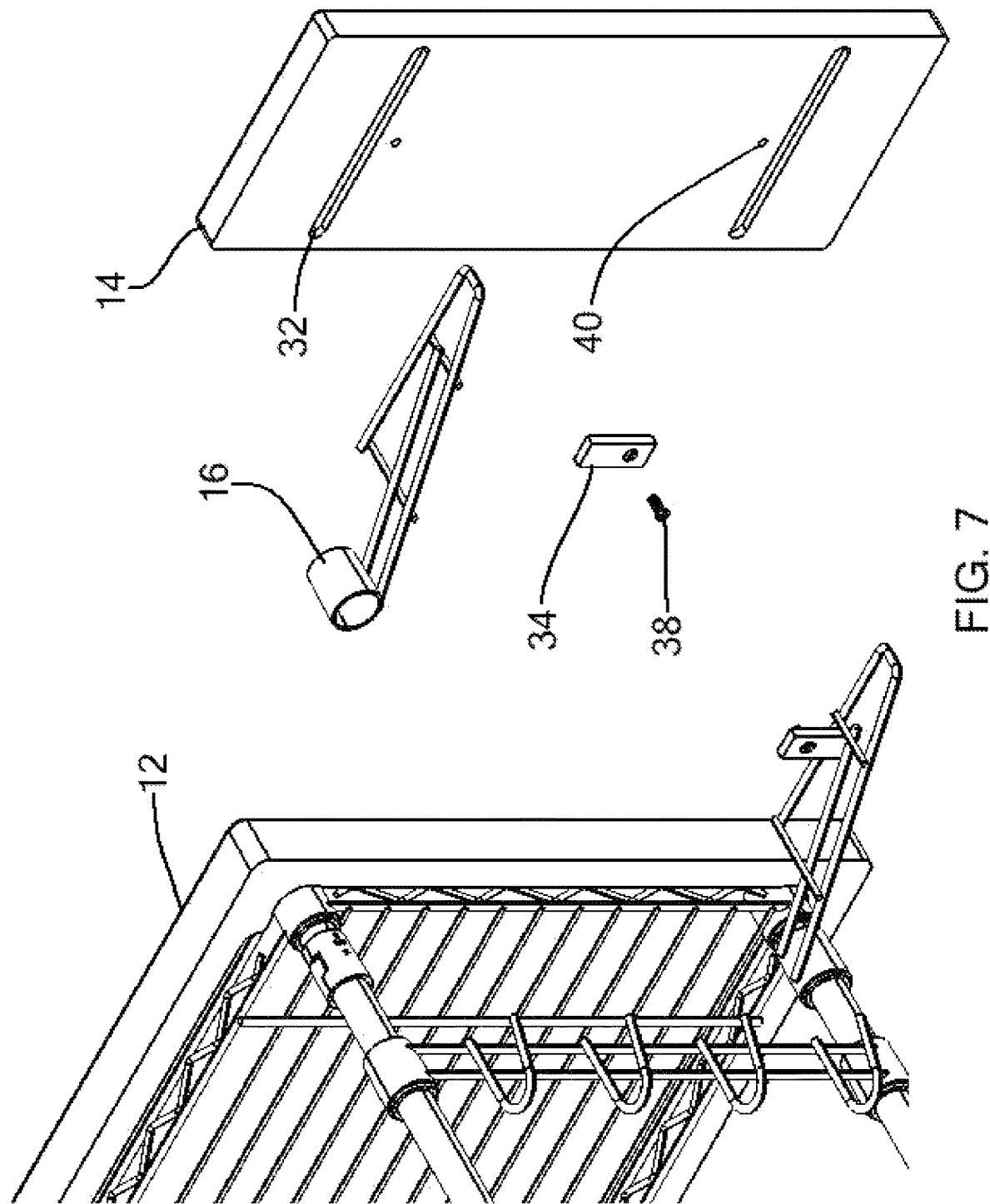
FIG. 7 illustrates a detailed bottom perspective view of the cart of FIG. 1, showing the shelf, arm and pivoting lock member in an exploded view.

Referring now to FIGS. 5 through 7, the side members 14 may include a bottom slot 32 formed in the underside thereof. Typically, two linear slots 32 may be formed along the bottom of the side members 14. The slots 32 can receive a top of the pivoting arm 16 therein when the side members 14 are used adjacent the top member 12. A pivoting lock 34 may be disposed on the bottom of the side member 14. The pivoting lock 34 may pivot about a pivot pin 38 disposed in a hole 40 on the bottom of the side members 14. The pivoting lock 34 may pivot to a retention position where the top of the pivoting arm 16 is retained in the slot 32 when in use. This prevents lifting of the side member 14 off of the pivoting arm 16. If the user desires to remove the side member 14, they can pivot the pivoting lock 34 so that it does not cover the slot 32 and lift the side member 14 away. Then, the pivoting arm 16 may be folded to a storage position under the top member 12, adjacent the support rack 18, as shown in FIG. 5. In some embodiments, the user can slightly lift the top member 12 in order to position the pivoting arm 16 into the storage position.

Figure 8:
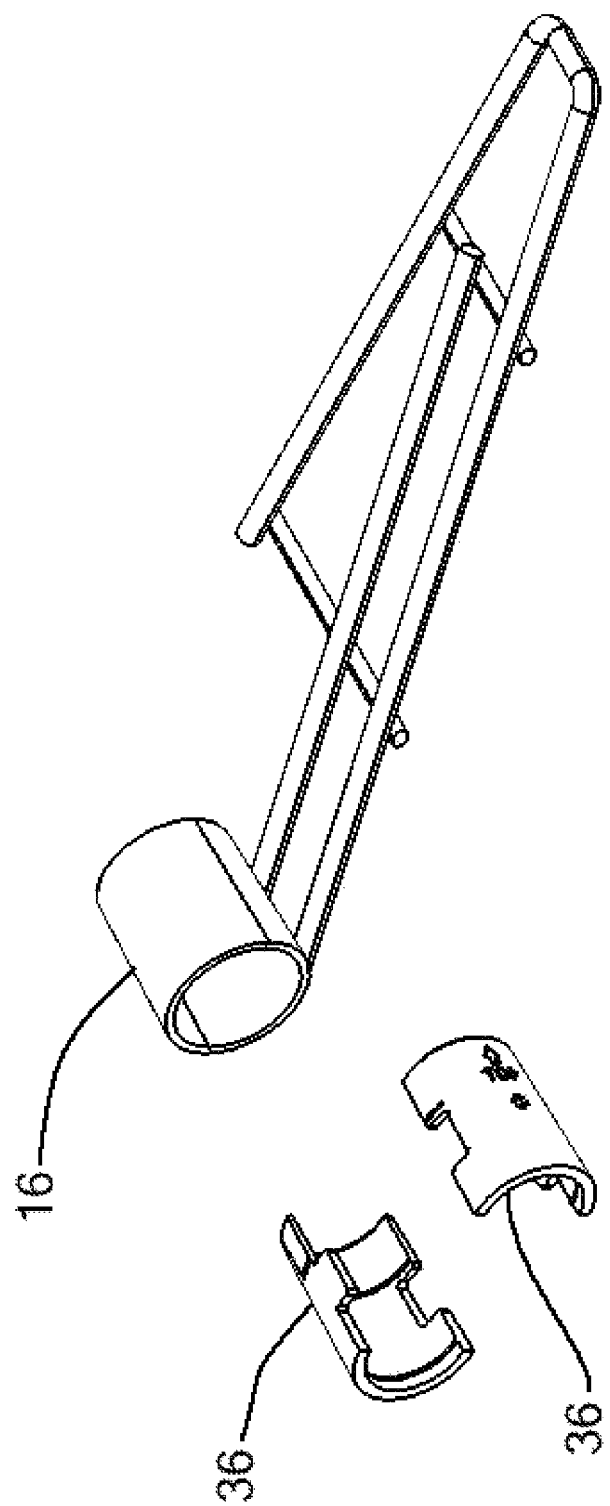
FIG. 8 illustrates an exploded detailed view of the pivoting arm and bushing member of the cart of FIG. 1.

Referring to FIG. 8, the pivoting arms 16 may be retained on the legs 20 with bushings 36. The bushings 36 may include an inside surface that engages with the legs 20 and an outer surface that engages with the pivoting arms 16, permitting the pivoting arms to pivot, but not slide down the legs 20. A similar type of bushing can be used to secure the middle basket or shelf 22 and the bottom basket or shelf 24 to the legs 20. Thus, the middle basket or shelf 22 may be height adjustable along the length of the legs 20. In some embodiments, the middle basket or shelf 22 may simply rest on a protrusion or stop formed in the legs 20, or at a joint between two leg members, or the like.

Similarly, the accessory, such as the hook arm 30, may attach to the legs 20 in a similar manner, thus permitting the hook arm 30 to be placed on either the left side or the right side of the cart 10, and further permitting the hook arm 30 to be placed at a desired height along the legs 20.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A cart comprising:
   a plurality of legs;
   a top member supported by the plurality of legs;
   at least one set of pivot arms disposed on adjacent ones of the plurality of legs; and
   a side member supportable, adjacent the top member, by the at least one set of pivot arms, wherein
   the at least one set of pivot arms is movable between a side member support position, extending outward from an outer periphery of the top member, and a storage position, disposed within the outer periphery of the top member;
   the at least one set of pivot arms are separate from the side member in the storage position; and
   the side member includes slots formed on a bottom side thereof, the slots configured to receive a top portion of each of the at least one set of pivot arms therein to limit or prevent movement of the side member when positioned adjacent the top member and supported by the at least one set of pivot arms positioned in the side member support position.

2. The cart of claim 1, wherein the plurality of legs includes four legs positioned adjacent corners of the top member.

3. The cart of claim 1, further comprising a top support disposed at a top end of each of the plurality of legs, the top support supporting the top member thereupon.

4. The cart of claim 1, further comprising a bottom storage element attached adjacent a bottom end of each of the plurality of legs.

5. The cart of claim 4, wherein the bottom storage element is one of a shelf and a basket.

6. A cart comprising:
   a plurality of legs;
   a top support supported at a top end of each of the plurality of legs;
   a top member supported on the top support;
   a pivot arm pivotably attached to each of the plurality of legs;
   a side member supportable, adjacent the top member, by respective ones of the pivot arm disposed on adjacent ones of the plurality of legs;
   a bottom storage element attached adjacent a bottom end of each of the plurality of legs; and
   a middle storage element attached along a length of each of the plurality of legs, wherein
   each pivot arm is movable between a side member support position, extending outward from an outer periphery of the top member, and a storage position, disposed within the outer periphery of the top member; and each pivot arm is separate from the side member in the storage position; and the side member includes slots formed on a bottom side thereof, the slots configured to receive a top portion of each respective pivot arm therein to limit or prevent movement of the side member when positioned adjacent the top member and supported by the pivot arm positioned in the side member support position.

7. The cart of claim 1, further comprising a middle storage element attached along a length of each of the plurality of legs.

8. The cart of claim 7, wherein the middle storage element is one of a shelf and a basket.

9. The cart of claim 1, further comprising a storage accessory spanning between adjacent ones of the plurality of legs.

10. The cart of claim 9, wherein the storage accessory is a hook arm.

11. The cart of claim 1, wherein the side member includes two side members positioned at opposite ends of the top member and the at least one set of pivot arms include two sets of two pivot arms.

12. The cart of claim 1, wherein the side member includes a pivoting lock movable between a first position, covering a portion of the slot, and a second position that does not cover the slot the pivoting lock movable from the second position to the first position after the side member is positioned with the portion of the at least one set of pivot arms positioned in the slots, thereby preventing removal of the side member from the at least one set of pivot arms.

13. The cart of claim 1, wherein the at least one set of pivot arms are supported onto the plurality of legs with bushings.

14. The cart of claim 6, wherein the side member includes a pivoting lock movable between a first position, covering a portion of the slot, and a second position that does not cover the slot the pivoting lock movable from the second position to the first position after the side member is positioned with the portion of the pivot arm positioned in the slots, thereby preventing removal of the side member from the pivot arm.

15. The cart of claim 6, wherein each of the middle storage element and the bottom storage element are independently selected from one of a shelf and a basket.

* * * * *